(12) United States Patent
Mochizuki

(10) Patent No.: US 10,776,956 B2
(45) Date of Patent: Sep. 15, 2020

(54) IMAGE CODING APPARATUS, IMAGE DECODING APPARATUS, IMAGE CODING METHOD, IMAGE DECODING METHOD, AND NON-TRANSITORY COMPUTER-READABLE STORAGE MEDIUM

(71) Applicant: CANON KABUSHIKI KAISHA, Tokyo (JP)

(72) Inventor: Shigeki Mochizuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 204 days.

(21) Appl. No.: 16/009,304

(22) Filed: Jun. 15, 2018

(65) Prior Publication Data

US 2018/0365863 A1 Dec. 20, 2018

(30) Foreign Application Priority Data

Jun. 19, 2017 (JP) .................................. 2017-119887

(51) Int. Cl.
*G06T 9/00* (2006.01)
*H04N 19/124* (2014.01)
(Continued)

(52) U.S. Cl.
CPC ............. *G06T 9/00* (2013.01); *H04N 19/124* (2014.11); *H04N 19/154* (2014.11);
(Continued)

(58) Field of Classification Search
CPC ...... H04N 19/60; H04N 19/96; H04N 19/129; H04N 19/176; H04N 19/91; H04N 19/124; H04N 19/30; H04N 19/24; H04N 19/63; H04N 19/115; H04N 19/12; H04N 19/11; H04N 19/13; H04N 19/14; H04N 19/61; H04N 19/46; H04N 19/18; H04N 19/172;
(Continued)

(56) References Cited

U.S. PATENT DOCUMENTS 4,922,273 A * 5/1990 Yonekawa ........... H04N 19/176
375/E7.14
4,969,192 A * 11/1990 Chen ....................... G10L 19/06
704/222

(Continued)

FOREIGN PATENT DOCUMENTS

JP 2002-516540 A 6/2002
WO 99/60793 A1 11/1999

*Primary Examiner* — Aklilu K Woldemariam
(74) *Attorney, Agent, or Firm* — Cowan, Liebowitz & Latman, P.C.

(57) ABSTRACT

An image coding apparatus comprising, a generating unit configured to generate a plurality of pieces of sub-band data from RAW data, a quantization parameter generating unit configured to divide each piece of sub-band data into equal numbers of segments, and generate a first quantization parameter set individually for each segment and common for the plurality of pieces of sub-band data in the same segment, a quantizing unit configured to quantize the segments of the plurality of pieces of sub-band data on the basis of the quantization parameter generated by the quantization parameter generating unit, and a coding unit configured to code a quantization result, obtained from the quantizing, for each piece of sub-band data.

20 Claims, 16 Drawing Sheets

BAYER PATTERN(R/G1/G2/B)

(51) Int. Cl.
*H04N 19/154* (2014.01)
*H04N 19/169* (2014.01)
*H04N 19/63* (2014.01)
*H04N 19/196* (2014.01)

(52) U.S. Cl.
CPC ....... *H04N 19/1883* (2014.11); *H04N 19/196* (2014.11); *H04N 19/63* (2014.11)

(58) Field of Classification Search
CPC ...... H04N 19/36; H04N 19/51; H04N 19/137; H04N 19/159; H04N 19/52; H04N 19/20; H04N 19/517; G06T 17/005; G06T 9/00; G06T 2210/56; G10L 19/06; G10L 2019/0011; G10L 2019/0013; G10L 2019/0014
USPC ..... 375/25–34, 122, 240; 382/248, 240, 251
See application file for complete search history.

(56) References Cited

U.S. PATENT DOCUMENTS

| | | | | |
|---|---|---|---|---|
| 5,283,646 A | * | 2/1994 | Bruder | H04N 19/197 341/76 |
| 5,995,148 A | * | 11/1999 | Haskell | H04N 19/61 375/240.04 |
| 6,259,734 B1 | * | 7/2001 | Boon | H04N 19/523 375/240 |
| 2005/0196058 A1 | * | 9/2005 | Fukuhara | H04N 19/63 382/240 |
| 2007/0258518 A1 | * | 11/2007 | Tu | H04N 19/46 375/240.03 |
| 2012/0128065 A1 | * | 5/2012 | Shibahara | H04N 19/122 375/240.03 |
| 2012/0257839 A1 | * | 10/2012 | Li | H04N 19/91 382/251 |
| 2013/0173275 A1 | * | 7/2013 | Liu | G10L 19/24 704/500 |
| 2013/0272621 A1 | * | 10/2013 | Lasserre | H04N 19/176 382/233 |
| 2014/0348247 A1 | * | 11/2014 | Tsukuba | H04N 19/96 375/240.26 |
| 2014/0369406 A1 | * | 12/2014 | Iizuka | H04N 19/124 375/240.03 |
| 2015/0264354 A1 | * | 9/2015 | Zhang | H04N 19/18 375/240.03 |
| 2016/0227225 A1 | * | 8/2016 | Zou | H04N 19/96 |
| 2017/0347122 A1 | * | 11/2017 | Chou | G06T 17/005 |
| 2019/0116361 A1 | * | 4/2019 | Rusanovskyy | H04N 16/463 |

\* cited by examiner

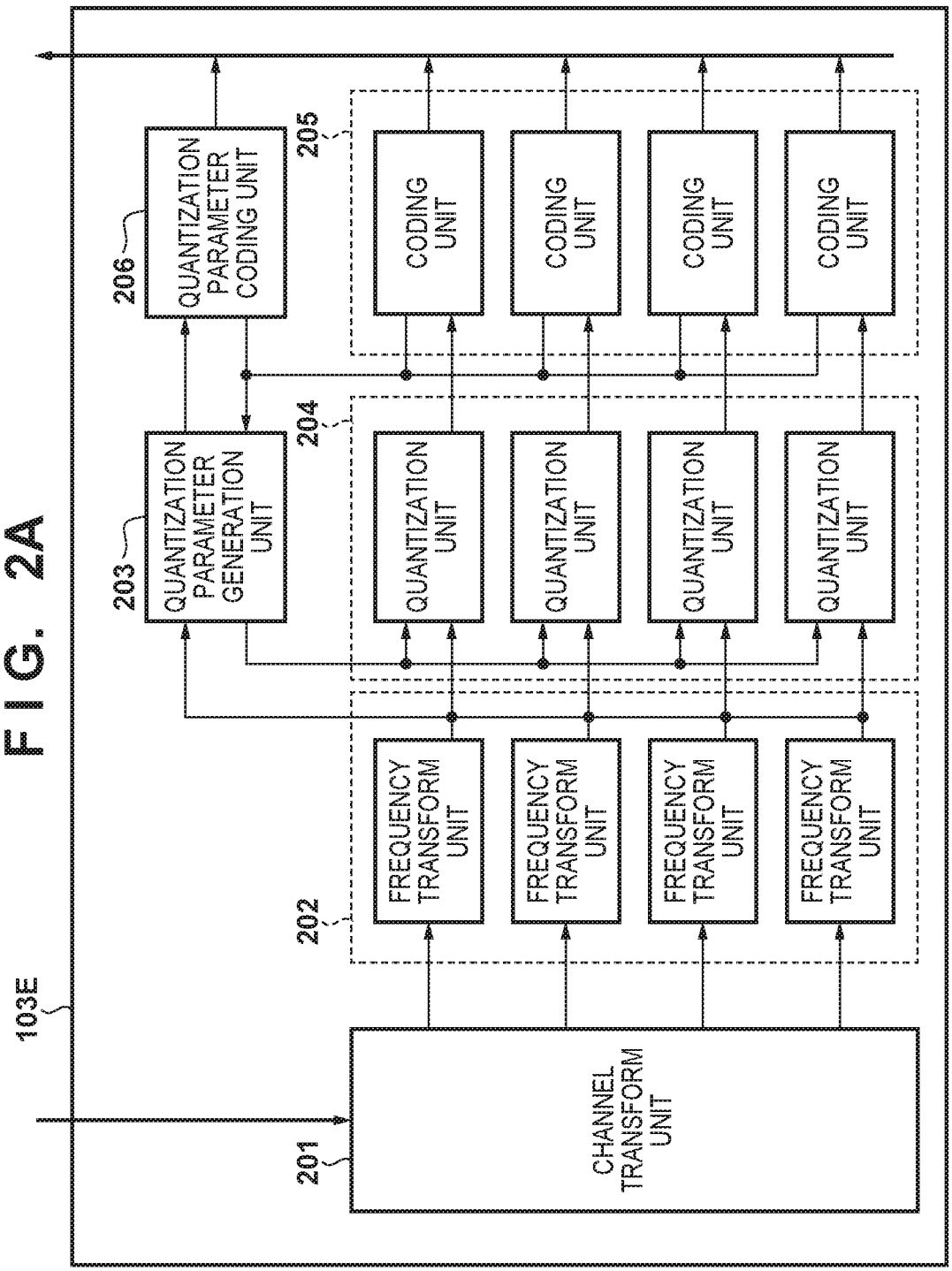

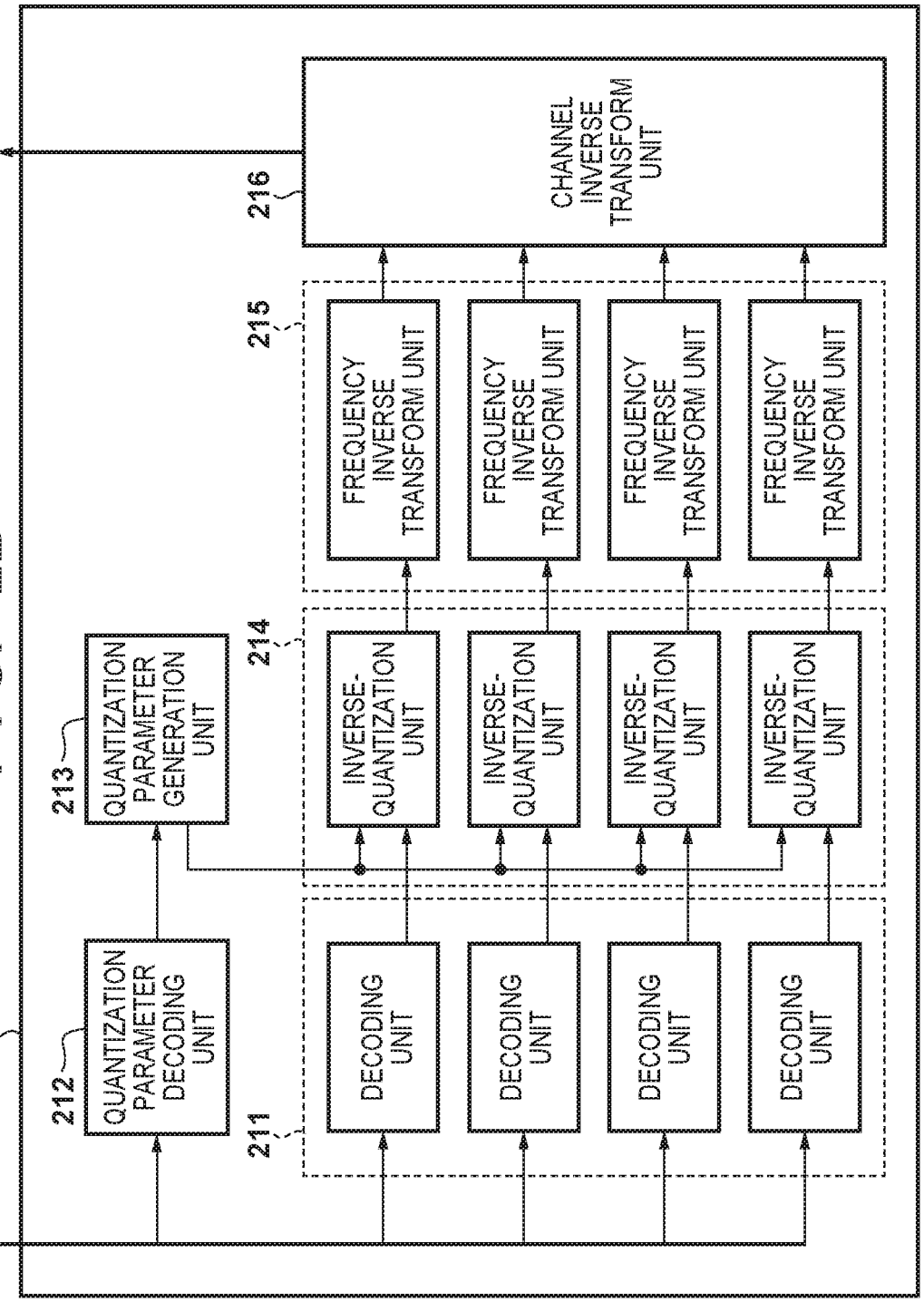

PREDICTED VALUE $pd = \begin{cases} \max(a,b) & \text{if } c \leq \min(a,b) \\ \min(a,b) & \text{if } c \geq \max(a,b) \\ a+b-c & \text{otherwise} \end{cases}$

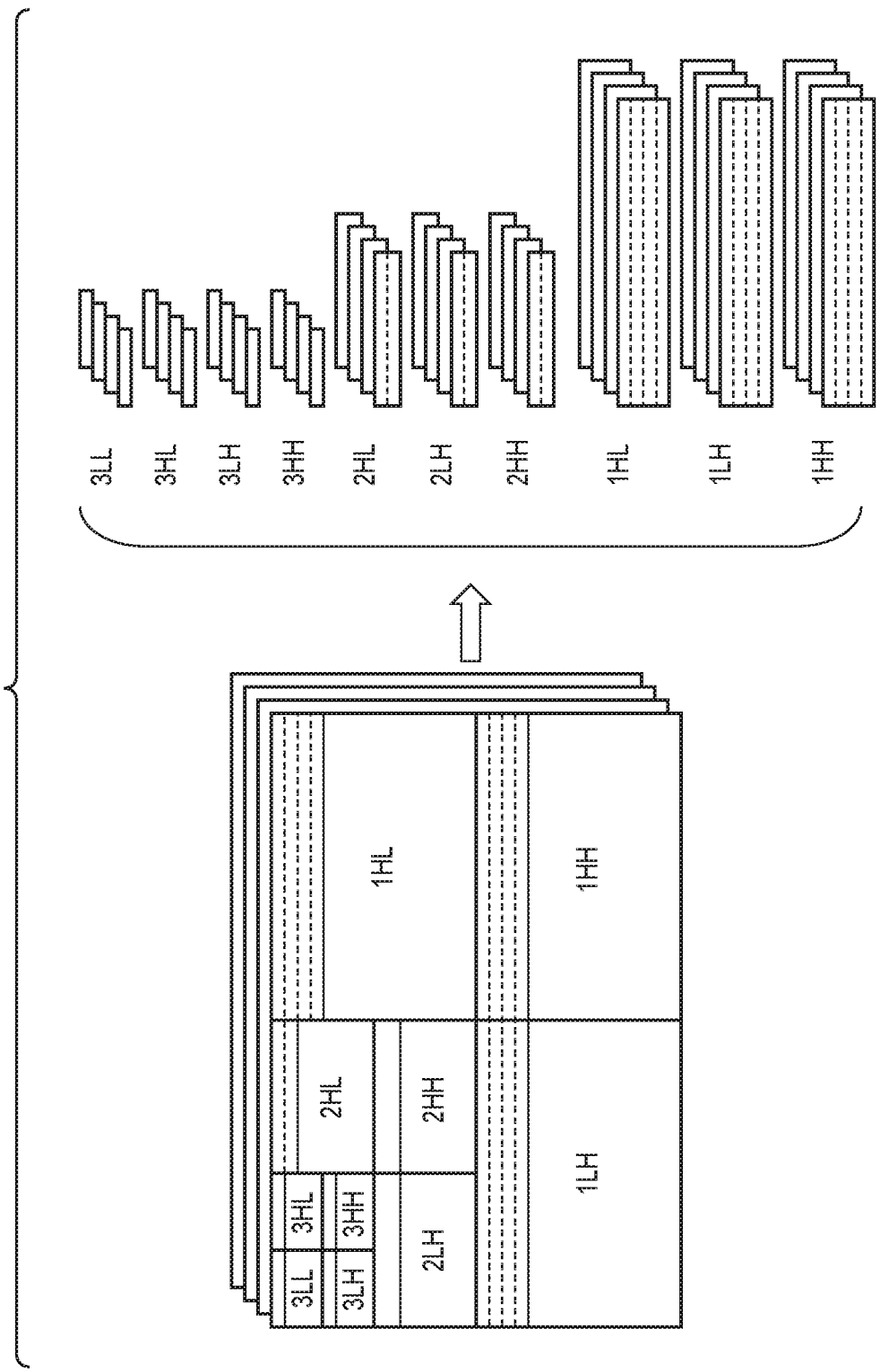

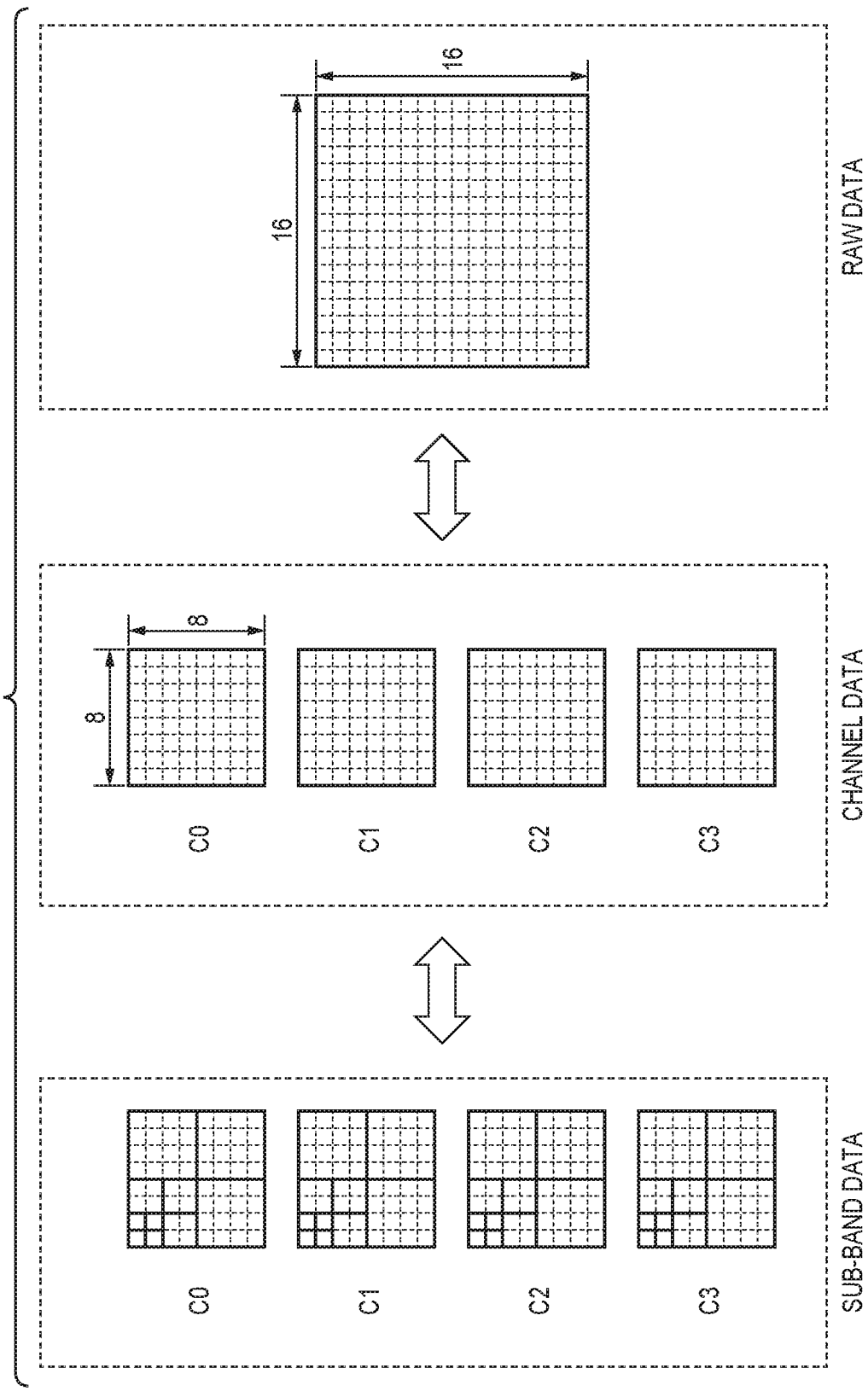

F I G. 10A

| main_header ( ) { | |
|---|---|
| coded_data_size | u (32) |
| width | u (32) |
| height | u (32) |
| depth | u (8) |
| channel | u (8) |
| type | u (8) |
| lev | u (8) |
| } | |

※ u (8)  : unsigned integer 8 bits
※ u (16) : unsigned integer 16 bits
※ u (32) : unsigned integer 32 bits

F I G. 10B

| tile_header ( ) { | |
|---|---|
| tile_index | u (32) |
| tile_data_size | u (32) |
| tile_width | u (32) |
| tile_height | u (32) |
| } | |

※ u (8)  : unsigned integer 8 bits
※ u (16) : unsigned integer 16 bits
※ u (32) : unsigned integer 32 bits

FIG. 10C

| qp_header ( ) { | |
|---|---|
| qp_data_size | u (32) |
| qp_width | u (32) |
| qp_height | u (32) |
| } | |

※ u (8) : unsigned integer 8 bits
※ u (16) : unsigned integer 16 bits
※ u (32) : unsigned integer 32 bits

FIG. 10D

| channel_header ( ) { | |
|---|---|
| channel_index | u (32) |
| channel_data_size | u (32) |
| } | |

※ u (8) : unsigned integer 8 bits
※ u (16) : unsigned integer 16 bits
※ u (32) : unsigned integer 32 bits

FIG. 10E

| sb_header ( ) { | |
|---|---|
| sb_index | u (32) |
| sb_data_size | u (32) |
| sb_qp_a | u (16) |
| sb_qp_b | u (16) |
| } | |

※ u (8) : unsigned integer 8 bits
※ u (16) : unsigned integer 16 bits
※ u (32) : unsigned integer 32 bits

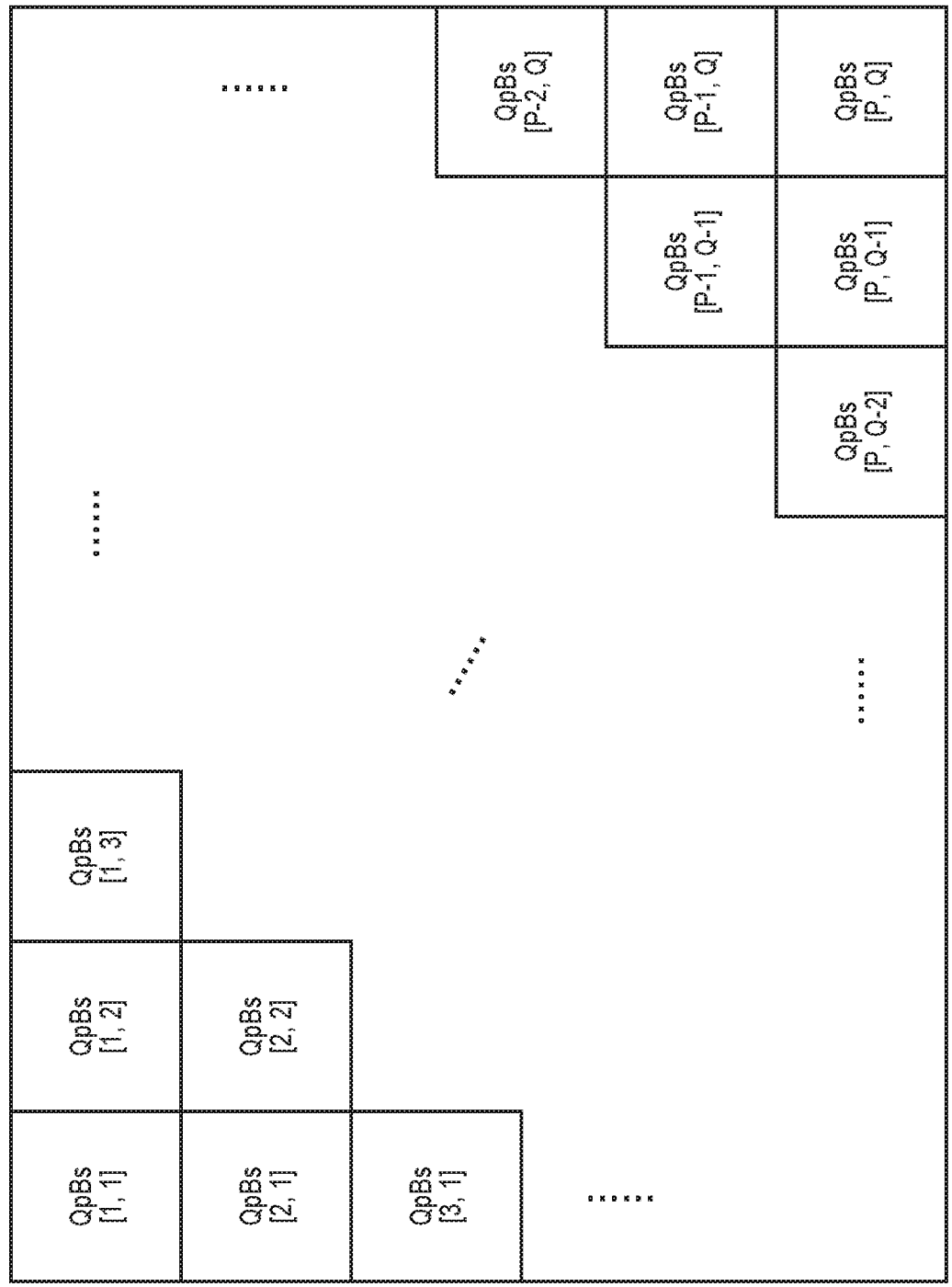

QUANTIZATION

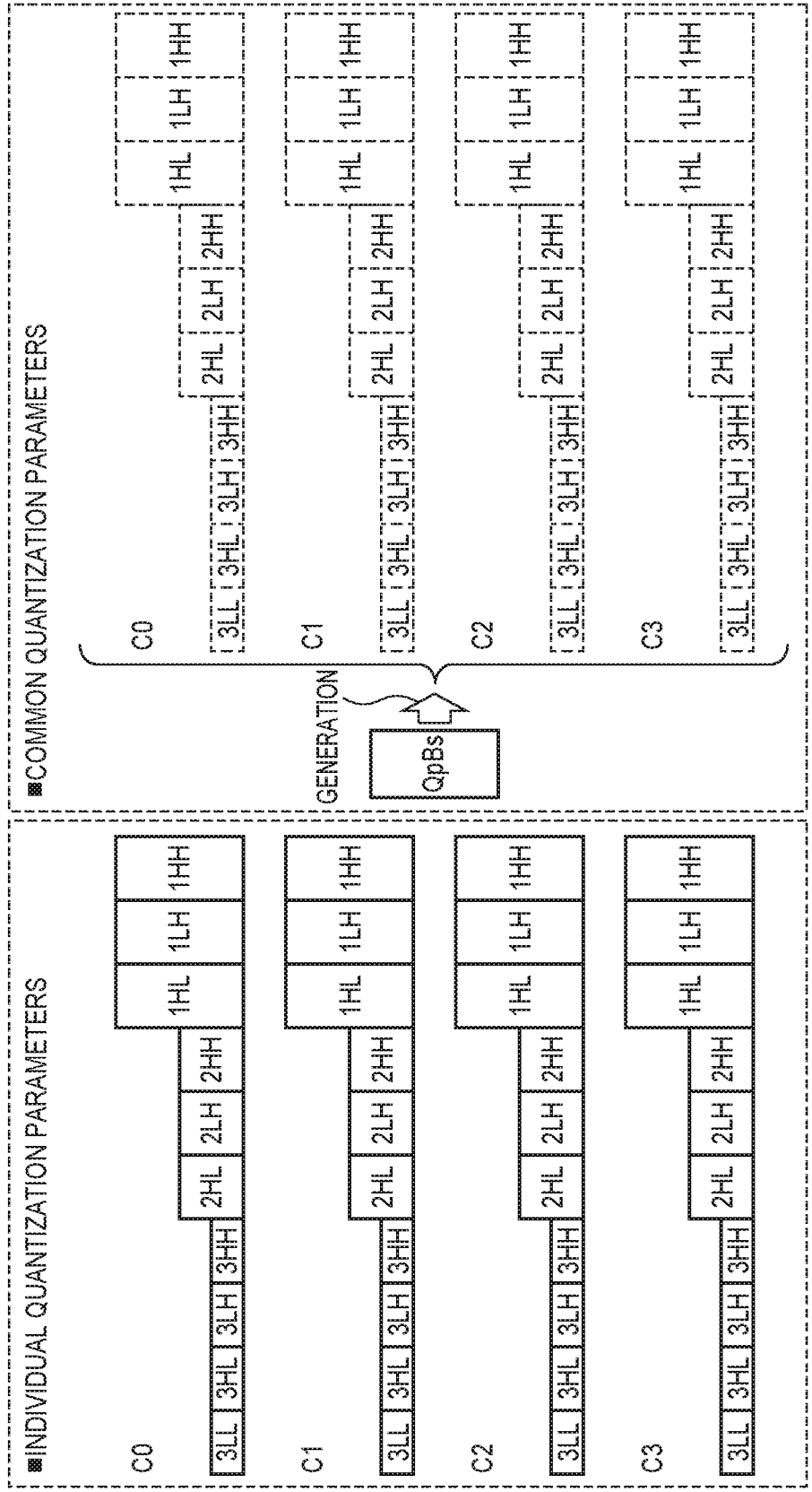

IMAGE CODING APPARATUS, IMAGE DECODING APPARATUS, IMAGE CODING METHOD, IMAGE DECODING METHOD, AND NON-TRANSITORY COMPUTER-READABLE STORAGE MEDIUM

BACKGROUND OF THE INVENTION

Field of the Invention

This invention relates to an image coding apparatus, an image decoding apparatus, an image coding method, an image decoding method, and a non-transitory computer-readable storage medium.

Description of the Related Art

CCDs or CMOS image sensors are widely employed as image sensors in current digital cameras. A single-panel image sensor obtains green, blue, and red pixel data (called "RAW data" hereinafter) by employing what is known as a Bayer pattern color filter. A digital camera subjects RAW data to a developing process including demosaicing, noise removal, optical distortion correction, and color correction to generate final image data, which can then be recorded as compressed image data in a format such as REG in the case of still images and H.264 in the case of moving images. A function for recording pre-developing RAW data so that a user can carry out the developing process according to his/her preferences is also provided.

Uncompressed or losslessly-compressed formats are often used when recording RAW data, and thus the size of the recorded RAW data is typically greater than developed compressed image data. On the other hand, as the densities and resolutions of image sensors increase, recording RAW data at compact sizes is becoming increasingly important. As a lossy compression format that shows no loss visually, a method has been proposed in which a plurality of color channels are generated from RAW data, each channel is subjected to a two-dimensional discrete wavelet transform, and each of generated sub-bands is individually quantized and compressed and then recorded as coded data (see Japanese Patent Laid-Open No. 2002-516540).

However, if four color channels are generated from RAW data and then subjected to three-level octave division through the two-dimensional discrete wavelet transform, each channel will be divided into 10 sub-bands, which means that four channels×10 sub-bands will be generated. Thus 4×10=40 quantization parameters are required to individually quantize the sub-bands. Assuming that finer quantization control is to be carried out in predetermined block units in accordance with features within the screen, a number of quantization parameters equivalent to 4×10×the number of block divisions are required. All of the quantization parameters are included in the coded data, which produces a massive data amount for the quantization parameters involved in the RAW data compression. In this case, it is difficult to record the RAW data at a compact size while maintaining image quality that shows no loss visually.

SUMMARY OF THE INVENTION

Accordingly, this invention provides a technique that enables RAW data to be recorded at a compact size by suppressing the data amount of quantization parameters included in coded data while implementing lossy compression through flexible quantization control when compressing the RAW data.

One aspect of embodiments of the invention relates to an image coding apparatus comprising, a generating unit configured to generate a plurality of pieces of sub-band data from RAW data, a quantization parameter generating unit configured to divide each piece of sub-band data into equal numbers of segments, and generate a first quantization parameter set individually for each segment and common for the plurality of pieces of sub-band data in the same segment, a quantizing unit configured to quantize the segments of the plurality of pieces of sub-band data on the basis of the quantization parameter generated by the quantization parameter generating unit, and a coding unit configured to code a quantization result, obtained from the quantizing, for each piece of sub-band data.

Further features of the present invention will become apparent from the following description of exemplary embodiments (with reference to the attached drawings).

BRIEF DESCRIPTION OF THE DRAWINGS

FIG. 2A is a block diagram illustrating an example of the configuration of a RAW data coding unit 103E according to an embodiment of the invention.

FIG. 2B is a block diagram illustrating an example of the configuration of a RAW data decoding unit 103D according to an embodiment of the invention.

FIG. 5 is a diagram illustrating an example of units of quantization control according to an embodiment of the invention.

FIG. 8 is a diagram illustrating an example of the relationship between of units of quantization control and RAW data with respect to image quality control, according to an embodiment of the invention.

FIG. 10A is a diagram illustrating an example of syntax elements in header information according to an embodiment of the invention.

FIG. 10B is a diagram illustrating an example of syntax elements in header information according to an embodiment of the invention.

FIG. 10C is a diagram illustrating an example of syntax elements in header information according to an embodiment of the invention.

FIG. 10D is a diagram illustrating an example of syntax elements in header information according to an embodiment of the invention.

FIG. 10E is a diagram illustrating an example of syntax elements in header information according to an embodiment of the invention.

FIG. 11 is a diagram illustrating an example of mapping common quantization parameters to a two-dimensional coordinate system according to an embodiment of the invention.

FIG. 13 is a diagram illustrating a comparison of a data amount of coded data according to the second embodiment of the invention with a conventional technique.

DESCRIPTION OF THE EMBODIMENTS

Embodiments of the invention will be described hereinafter with reference to the drawings.

First Embodiment

Figure 1A:
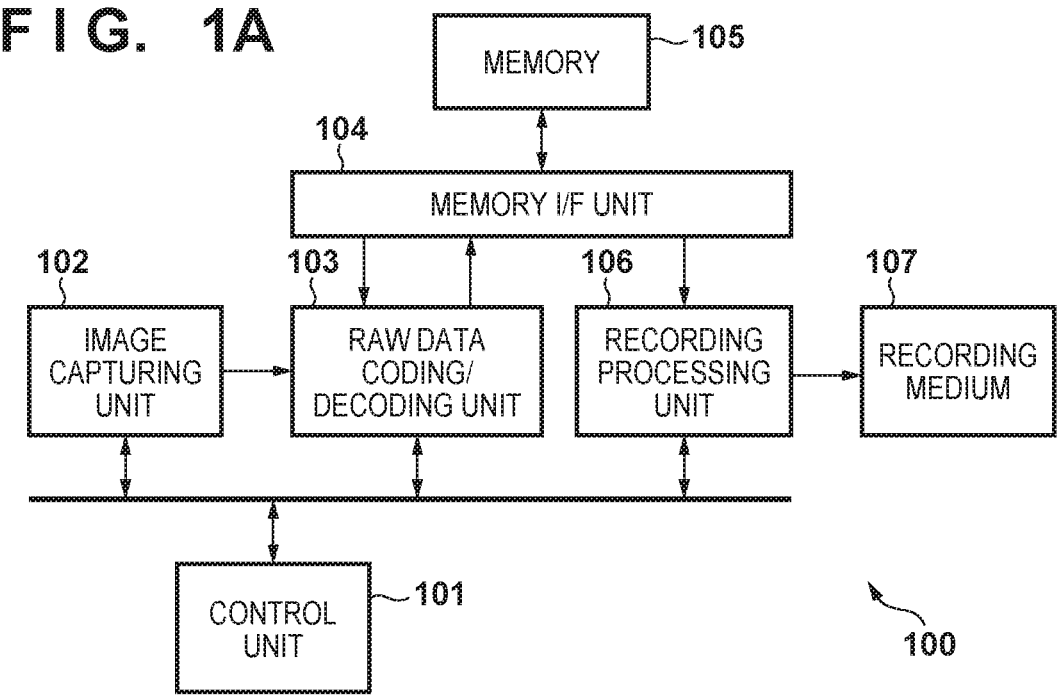
FIG. 1A is a block diagram illustrating an example of the configuration of an image processing apparatus according to an embodiment of the invention.

An embodiment of the invention will be described hereinafter. FIG. 1A illustrates an image capturing apparatus 100 according to an embodiment of the invention. The image capturing apparatus 100 can be realized as a digital camera or a digital video camera, for example. Aside from these, the image capturing apparatus 100 can also be realized as any information processing terminal or image processing apparatus, such as a personal computer, a mobile phone, a smartphone, a PDA, a tablet terminal, a mobile media player, or the like. FIG. 1A assumes a situation where the apparatus functions as an image capturing apparatus, i.e. a digital camera or the like, and therefore illustrates a configuration that includes an image capturing unit 102. However, a configuration that does not include the image capturing unit 102, such as an image coding apparatus/image decoding apparatus, an image recording apparatus, an image compression apparatus, or an image restoration apparatus capable of compressing, recording, and playing back RAW images, may be implemented as an embodiment of the invention.

In the image capturing apparatus 100, a control unit 101 controls the various processing units constituting the image capturing apparatus 100. The image capturing unit 102 includes a lens optical system including an optical lens, an aperture, and a focus control and lens driving unit, and that is capable of optical zooming; and an image sensor, such as a CCD image sensor or a CMOS image sensor, that transforms optical information from the lens optical system into electrical signals. The image capturing unit 102 outputs RAW data, obtained by transforming the electrical signals obtained from the image sensor into digital signals, to a RAW data coding/decoding unit 103.

Figure 1B:
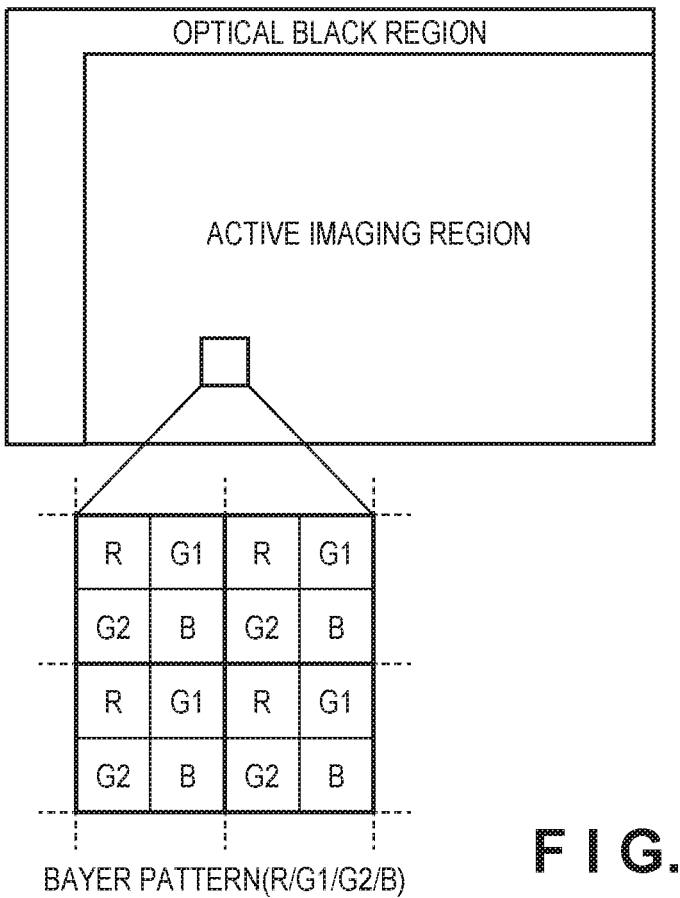
FIG. 1B is a diagram illustrating Bayer pattern RAW data according to an embodiment of the invention.

Here, the RAW data is, as illustrated in FIG. 1B, constituted of an active imaging region, which is a pixel region that receives light, and an optical black region, which is a pixel region that block light. Each pixel is constituted by a periodic pattern of R (red), G1 (green), G2 (green), and B (blue). The human sense of vision is more sensitive to luminance components than to color components, and thus green, which contains more luminance components, is given twice the surface area as red and blue. Although the RAW data is constituted by four color elements in a Bayer pattern in this embodiment, the pattern and the color elements are not limited to this configuration, and another system may be used instead.

The RAW data coding/decoding unit 103 codes the RAW data obtained from the image capturing unit 102 and writes the generated coded data into memory 105. Uncoded RAW data may be obtained from a recording medium 107, and coded data may then be generated by executing a coding process according to this embodiment. The RAW data coding/decoding unit 103 can also restore the RAW data by decoding the coded data. Configurations and operations pertaining to the RAW data coding/decoding unit 103 will be described in detail later.

A memory I/F unit 104 arbitrates memory access requests from the various processing units, and controls the reading from and writing to the memory 105. The memory 105 is a storage region, constituted by volatile memory, for example, for storing various types of data output from the processing units constituting the image capturing apparatus 100. A recording processing unit 106 reads out the coded data stored in the memory 105, formats the data according to a predetermined recording format, and records the data into the recording medium 107. The recording medium 107 is a recording medium constituted by non-volatile memory, for example, and is configured to be removable from the image capturing apparatus 100. The image capturing apparatus is constituted by the processing units described above.

The configuration of and flow of processing by the RAW data coding/decoding unit 103 will be described in detail next with reference to the block diagrams of FIGS. 2A and 2B. FIG. 2A illustrates the configuration of a RAW data coding unit 103E of the RAW data coding/decoding unit 103, and FIG. 2B illustrates the configuration of a RAW data decoding unit 103D of the RAW data coding/decoding unit 103.

Figure 3A:
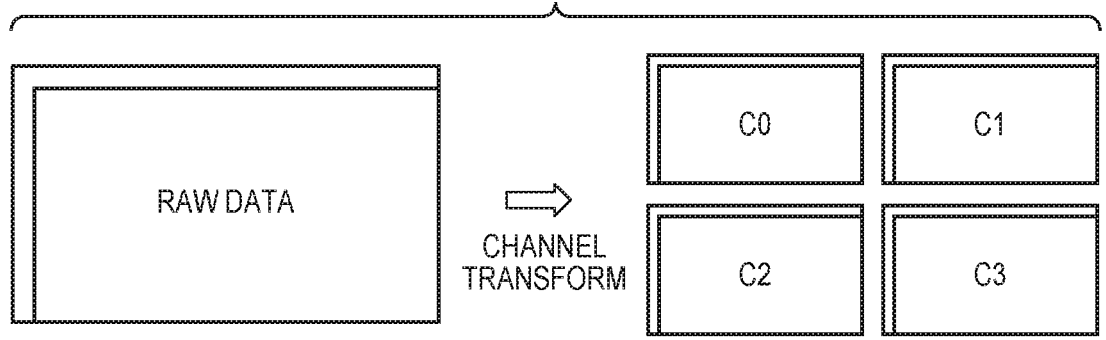
FIG. 3A is a diagram illustrating an example of channel transformation according to an embodiment of the invention.
Figure 3B:
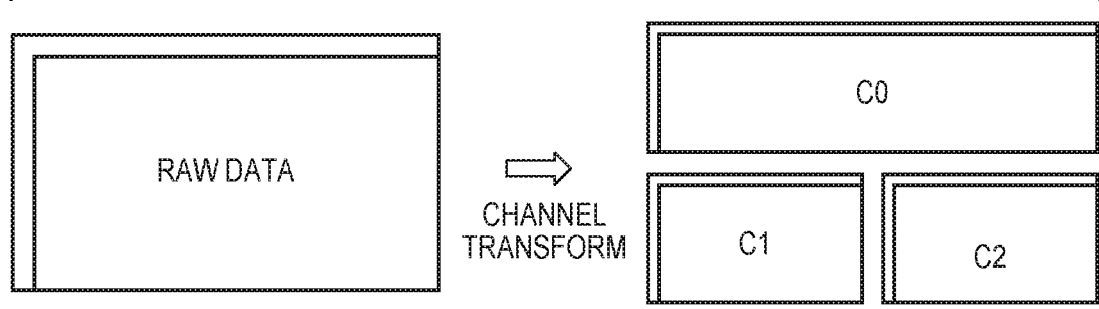
FIG. 3B is a diagram illustrating another example of channel transformation according to an embodiment of the invention.
Figure 3C:
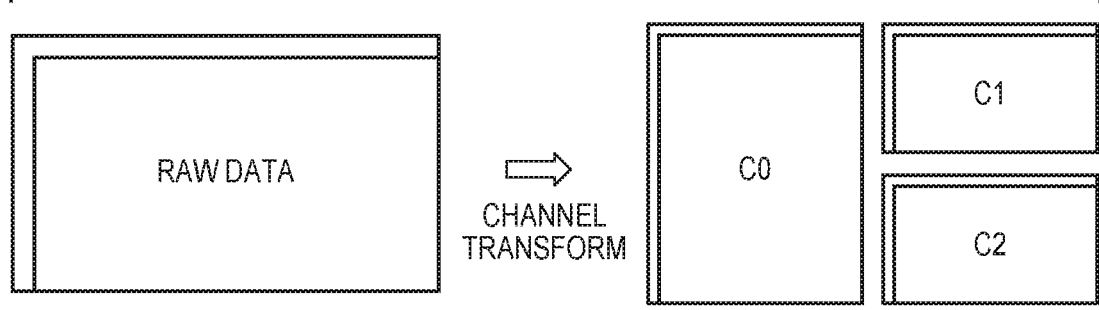
FIG. 3C is a diagram illustrating another example of channel transformation according to an embodiment of the invention.

The RAW data coding unit 103E illustrated in FIG. 2A is constituted primarily of a channel transform unit 201, frequency transform units 202, a quantization parameter generation unit 203, quantization units 204, coding units 205, and a quantization parameter coding unit 206. The channel transform unit 201 transforms inputted Bayer pattern RAW data into a plurality of channels, as illustrated in FIGS. 3A to 3C. The frequency transform units 202 and the quantization units 204 are the same number of blocks as there are channels obtained from the transformation, and these units carry out processing in parallel. In this embodiment, the channel transform unit 201 can transform the RAW data into four channels, one for each of the Bayer pattern R, G1, G2, and B, for example. Furthermore, each of R, G1, G2, and B can be transformed into four channels, namely C0 to C3, through the following transformation equations.

$$C0 = a + c$$

$$C1 = B - G2$$

$$C2 = R - G1$$

$$C3 = b - a$$

where $a = G2 + [C1/2]$, $b = G1 + [C2/2]$; and $c = a + [C3/2]$ (Equation 1)

A floor function [x] in these equations expresses a maximum integer less than or equal to x.

Although an example of a configuration that transforms into four channels, as illustrated in FIG. 3A, is given here, a different number of channels or a different transformation method may be used, such as transforming into three channels, namely one for R, one for G including G1 and G2, and one for B, as illustrated in FIGS. 3B and 3C.

Next, the frequency transform units 202 carry out a frequency transformation process through discrete wavelet transform at a predetermined resolution level (called simply "level" or "lev" hereinafter) in units of channels, and output a generated plurality of sub-band data (transformation coefficients) to the quantization parameter generation unit 203 and the quantization units 204.

Figure 4A:
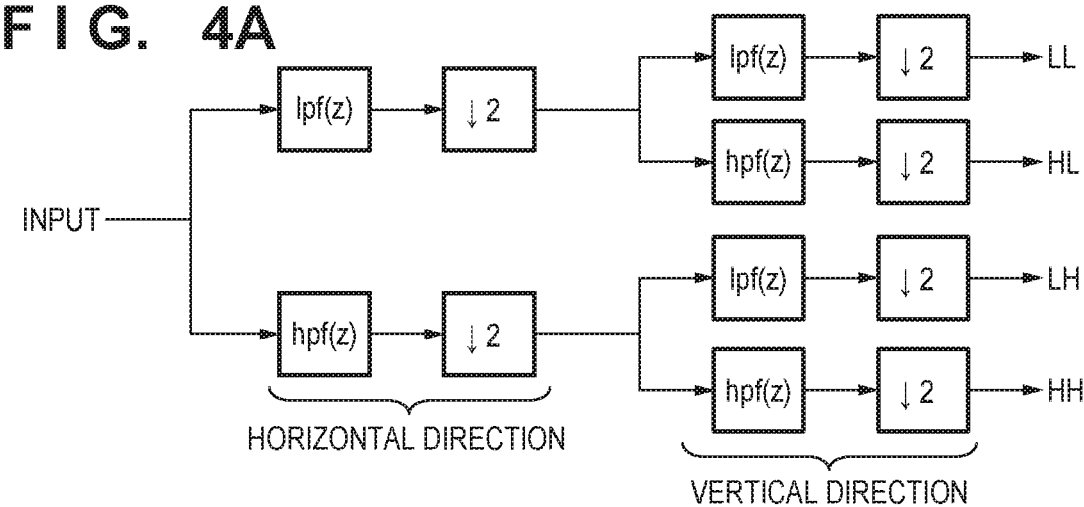
FIG. 4A is a diagram illustrating an example of a filter bank configuration according to an embodiment of the invention.
Figure 4B:
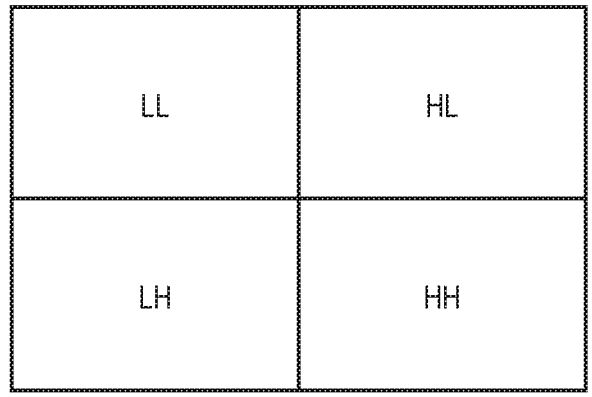
FIG. 4B is a diagram illustrating frequency transformation (sub-band division) according to an embodiment of the invention.

FIG. 4A illustrates a filter bank configuration for implementing the discrete wavelet transform pertaining to a lev=1 sub-band division process. The discrete wavelet transform process is executed in the horizontal and vertical directions, and as a result, the channel is divided into a single low-frequency sub-band (LL) and three high-frequency sub-bands (HL, LH, and HH), as illustrated in FIG. 4B. Transfer functions of the low-pass filters ("lpf" hereinafter) and high-pass filters ("hpf" hereinafter) illustrated in FIG. 4A are expressed by the following equations 2 and 3, respectively.

$$\text{lpf}(z) = (-z^{-2} + 2z^{-1} + 6 + 2z - z^2)/8 \quad \text{(Equation 2)}$$

$$\text{hpf}(z) = (-z^{-1} + 2 - z)/2 \quad \text{(Equation 3)}$$

Figure 4C:
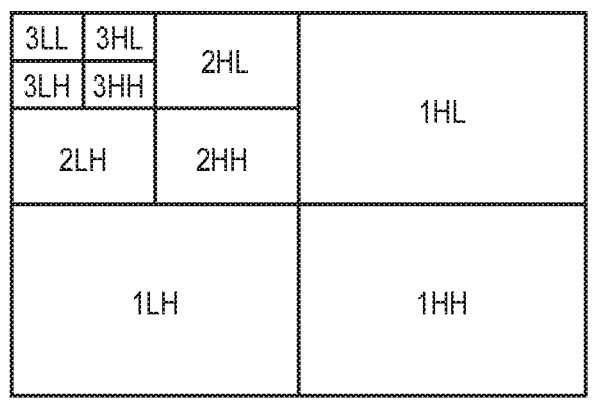
FIG. 4C is a diagram illustrating frequency transformation (sub-band division) according to an embodiment of the invention.

"↓2" expresses 2-to-1 downsampling. Thus downsampling is executed once each in the horizontal direction and the vertical direction, and thus the sub-band is ¼ the original size. If lev is higher than 1, sub-band division is executed hierarchically on the low-frequency sub-band (LL). For example, if lev=3, sub-band data corresponding to 10 sub-bands is generated, as illustrated in FIG. 4C. Although the discrete wavelet transform here is constituted by a five-tap lpf and a three-tap hpf as indicated in equations 2 and 3, the filter configuration may have a different number of taps and different coefficients.

The quantization parameter generation unit 203 generates first quantization parameters, common for all channels and all sub-bands, for carrying out a quantization process on the sub-band data (transformation coefficients) generated by the frequency transform units 202, and outputs the first quantization parameters to the quantization parameter coding unit 206. The quantization parameter generation unit 203 also generates individual second quantization parameters for each of the channels and sub-bands from the first quantization parameters, and supplies the second quantization parameters to the quantization units 204. The units of generation and generation methods of the first quantization parameters and the second quantization parameters will be described later with reference to FIGS. 5 to 7 and so on.

The quantization units 204 carry out quantization processes on the sub-band data (transformation coefficients) input from e frequency transform units 202, on the basis of the second quantization parameters supplied from the quantization parameter generation unit 203, and output quantized sub-band data (transformation coefficients) to the coding units 205 as quantization results.

Figure 4D:
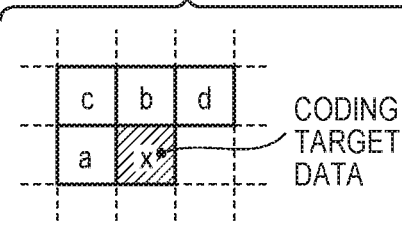
FIG. 4D is a diagram illustrating a predictive coding method (MED prediction) according to an embodiment of the invention.

The coding units 205 carry out predictive differential entropy coding in raster scan order, for each piece of sub-band data, on the quantized sub-band data (transformation coefficients) input from the quantization units 204. The quantized sub-band data is coded in units of sub-bands as a result. Here, as illustrated in FIG. 4D, a predicted value pd is generated through Median Edge Detector (MED) prediction from the data in the periphery of the coding target data (transformation coefficient). Difference data between a value xd of coding target data x and the predicted value pd is entropy-coded through, for example, Huffman coding or Golomb coding, and the generated coded data is stored in the memory 105. At this time, the starting data of each sub-band in the raster scan order has no peripheral data, and thus the value xd of the coding target data x is coded as-is. The difference data is coded for the coding target data thereafter. Note that other methods may be used for the predictive coding and the entropy coding. Generated code amounts, generated in units of lines for each sub-band, are supplied to the quantization parameter generation unit 203. The specific data structure of the coded data generated here will be described later with reference to FIGS. 9 and 10.

The quantization parameter coding unit 206 is a processing unit that codes the first quantization parameters input from the quantization parameter generation unit 203. The quantization parameter coding unit 206 codes the quantization parameter through the same coding method as the coding units 205, and stores the generated coded quantization parameters in the memory 105. Although FIG. 2A illustrates a case where the quantization parameter coding unit 206 is provided separate from the coding units 205, both units employ the same coding method, and thus a configuration in which the coding units 205 shares the function of the quantization parameter coding unit 206 is also possible. The RAW data coding unit 103E is configured as described thus far. The units 201 to 206 of the RAW data coding unit 103E may each use a dedicated circuit, or may be realized by generic processors. The units may also be realized by a single circuit or processor that implements a plurality of functions.

The configuration of the RAW data decoding unit 103D will be described next. The RAW data decoding unit 103D is constituted primarily of decoding units 211, a quantization parameter decoding unit 212, a quantization parameter generation unit 213, inverse quantization units 214, frequency inverse transform units 215, and a channel inverse transform unit 216.

First, the decoding units 211 decode the coded data input from the memory 105 through a decoding method corresponding to the coding method employed by the RAW data coding unit 103E, and restore the quantized sub-band data (transformation coefficients). For example, if a predictive differential entropy coding method has been used, a corresponding predictive differential entropy decoding method is employed. At this time, the coded data has been produced by entropy-coding the difference data between the predicted value pd, which is generated from the peripheral data of the coding target data (transformation coefficients), and the value xd of the coding target data x, as illustrated in FIG. 4D. Accordingly, when the decoding units 211 restore the difference data by decoding the coded data through an entropy decoding method, the coding target data x is restored by generating the predicted values pd from the decoded data in the periphery of the decoding target data and then adding the difference data. The coded data is constituted of data coded in units of sub-bands, and thus the decoding units 211 restore the transformation coefficients in units of sub-bands as well.

The quantization parameter decoding unit 212 decodes the coded first quantization parameters included in the coded data input from the memory 105, using the same decoding method as the decoding units 211, and restores the first quantization parameters. The quantization parameter decoding unit 212 also decodes predetermined coefficients ($\alpha$ and $\beta$ in equation 5, which will be described later) for calculating the second quantization parameters in units of channels and sub-bands. The decoding results are output to the quantization parameter generation unit 213. The quantization parameter generation unit 213 generates the second quantization parameters in units of channels and sub-bands from the first quantization parameters provided by the quantization parameter decoding unit 212 and the predetermined coefficients, and provides the second quantization parameters to the inverse quantization units 214.

The inverse quantization units 214 inverse-quantize the quantized sub-band data, which is in units of channels and has been output from the decoding units 211, using the second quantization parameters provided from the quantization parameter generation unit 213, and restores the sub-band data. The frequency inverse transform units 215 carry out frequency inverse transform processes through discrete wavelet inverse transform, and restore the channels from the sub-band data (transformation coefficients) in the predetermined division level. The channel inverse transform unit 216 inverse-transforms the input channel data and restores the original RAW data. For example, if the channel transform unit 201 of the RAW data coding unit 103E has transformed the Bayer pattern R, G1, G2, and B into the four channels C0 to C3 through equation 1, R, G1, G2, and B RAW data will be restored from the four channels C0 to C3 in accordance with an inverse transform process corresponding to equation 1. The RAW data decoding unit 103D is configured as described above. The units 211 to 216 of the RAW data decoding unit 103D may each use a dedicated circuit, or may be realized by generic processors. The units may also be realized by a single circuit or processor that implements a plurality of functions.

A quantization parameter generation process by the quantization parameter generation unit 203 will be described next. In this embodiment, the first quantization parameters common to all channels and all sub-bands are generated, and then the individual second quantization parameters for each of the channels and sub-bands are generated from the first quantization parameters. The quantization parameter generation unit 203 first generates the first quantization parameter common for all channels and all sub-bands by carrying out the quantization parameter generation process pertaining to code amount control in predetermined units of sub-band data, on the basis of a target code amount set in advance before coding.

This embodiment describes a case in which the first quantization parameters are not generated directly, and are instead generated in two stages. First, quantization parameters common for all channels and all sub-bands are generated in predetermined units of lines for each instance of sub-band data (third quantization parameters). The predetermined lines are then divided into units called "segments", and the first quantization parameters are generated by correcting the third quantization parameters in accordance with image quality characteristics of the sub-band data in the segments. The procedure for generating the first quantization parameters will be described in detail next.

FIG. 5 illustrates units for evaluating a code amount pertaining to code amount control and updating quantization parameters, in a case where each channel is divided into sub-bands at lev=3. In the four channels from C0 to C3, the sub-band data of 1×N (where N is an integer) lines in the vertical direction of the level 3 sub-bands (3LL, 3HL, 3LH, and 3HH), 2×N lines in the vertical direction of the level 2 sub-bands (2HL, 2LH, and 2HH), and 4×N lines in the vertical direction of the level 1 sub-bands (1HL, 1LH, and 1HH) are taken altogether as a single unit of processing (a first unit of processing). As illustrated in FIG. 5, the first unit of processing is set as a region (a band) obtained by dividing the sub-bands by every predetermined number of lines in the vertical direction. FIG. 5 illustrates a case where N=1 in particular.

The quantization parameter generation unit 203 compares the target code amount and the generated code amount corresponding to the first unit of processing, carries out feedback control on the data for all channels and all sub-bands at the next identical unit of processing so as to bring the generated code amount closer to the target generated code amount, and generates the third quantization parameters (QpBr) common for all channels and all sub-bands. If code amount control is not to be carried out on the RAW data within the screen, the QpBr common for all channels and all sub-bands may be set or generated so as to be fixed throughout the entire screen regardless of the unit of code amount control described above. The code amount control at this time can be executed according to the following equation 4.

$$QpBr(i)=QpBr(0)+r\times\Sigma\{S(i-1)-T(i-1)\} \qquad \text{Equation 4}$$

QpBr(0): initial quantization parameters
QpBr(i): ith quantization parameters (i>0)
r: control sensitivity
S: generated code amount
T: target code amount In equation 4, the initial quantization parameters set for the first band among the bands set for the sub-band data (the first unit of processing) are taken as a reference, and those initial quantization parameters are adjusted in accordance with the magnitude of a difference between the generated code amount and the target code amount. Specifically, the values of the initial quantization parameters are adjusted so as to reduce a code amount difference between the total code amount generated from the first band on (a total generated code amount) and a total of the corresponding target code amount (a total target code amount), and the third quantization parameters are set for the band to be processed. Parameters determined by the quantization parameter generation unit 203 on the basis of a compression rate or the like can be used as the initial quantization parameters set for the first band.

After the third quantization parameters (QpBr) have been generated for each band in this manner, the quantization parameter generation unit 203 further finely divides (segments) the bands, adjusts the third quantization parameters (QpBr) in accordance with an image quality evaluation result for the sub-band data in each segment, which is a second unit of processing, and generates the first quantization parameters (QpBs). This makes it possible to generate quantization parameters pertaining to image quality control for adjusting the strength of quantization in accordance with the properties of the RAW data.

Figure 6A:
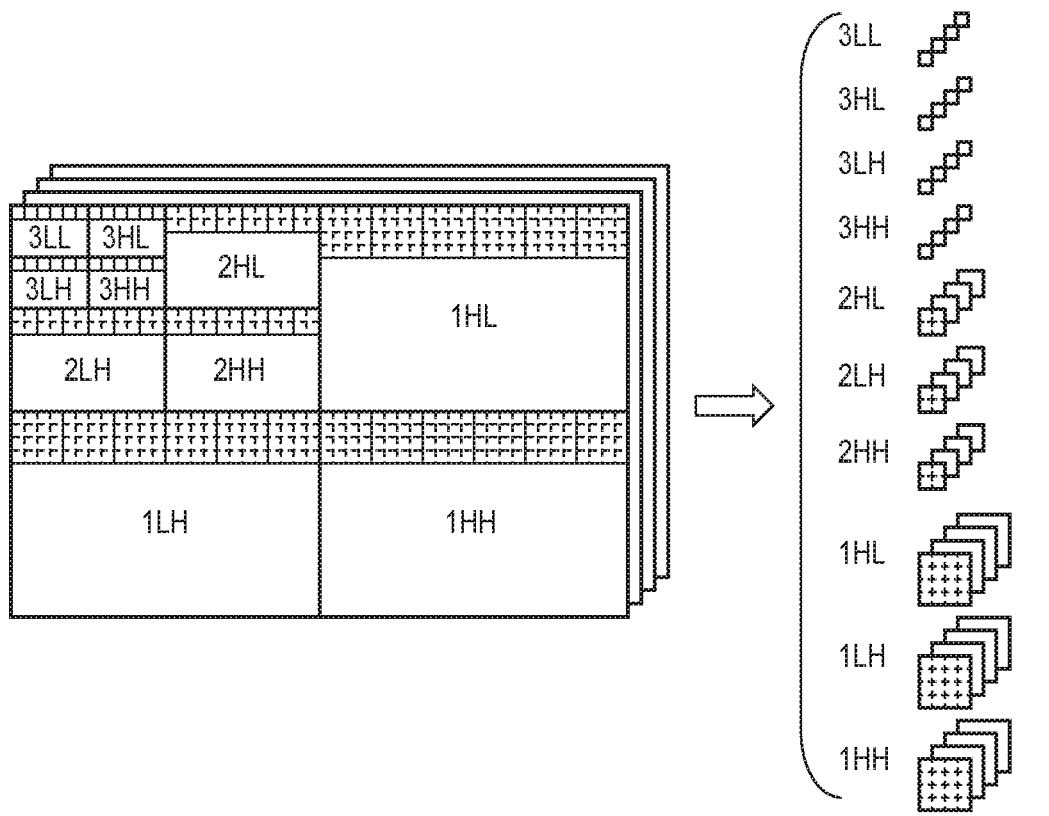
FIG. 6A is a diagram illustrating an example of second units of processing (segments) for evaluating sub-band data pertaining to image quality control and updating quantization parameters, according to an embodiment of the invention.

FIG. 6A illustrates the second unit of processing (segments) for evaluating sub-band data pertaining to image quality control and updating quantization parameters, when each channel has been divided into sub-bands as lev=3. The segments are (1×M) (1×N) (where M and N are integers) in the horizontal and vertical directions, respectively, for the level 3 sub-bands (3LL, 3HL, 3LH, and 3HH), (2×M)×(2×N) in the horizontal and vertical directions, respectively, for the level 2 sub-bands (2HL, 2LH, and 2HH), and (4×M)×(4×N) in the horizontal and vertical directions, respectively, for the level 1 sub-bands (1HL, 1LH, and 1HH), for all channels.

The segment illustrated here as the second unit of processing is obtained by dividing the band, which serves as the first unit of processing, in the horizontal direction. In this embodiment, the segmenting is carried out so that there are uniform numbers of segments in the sub-bands. If M=1 and N=1, the segment can be thought of as the result of dividing a band corresponding to level 1 into four pixel units in the horizontal direction. The quantization parameter generation unit 203 generates the first quantization parameters (QpBs) for each segment by correcting the third quantization parameters QpBr, calculated for each band, in accordance with the image quality characteristics for each segment.

Figure 6B:
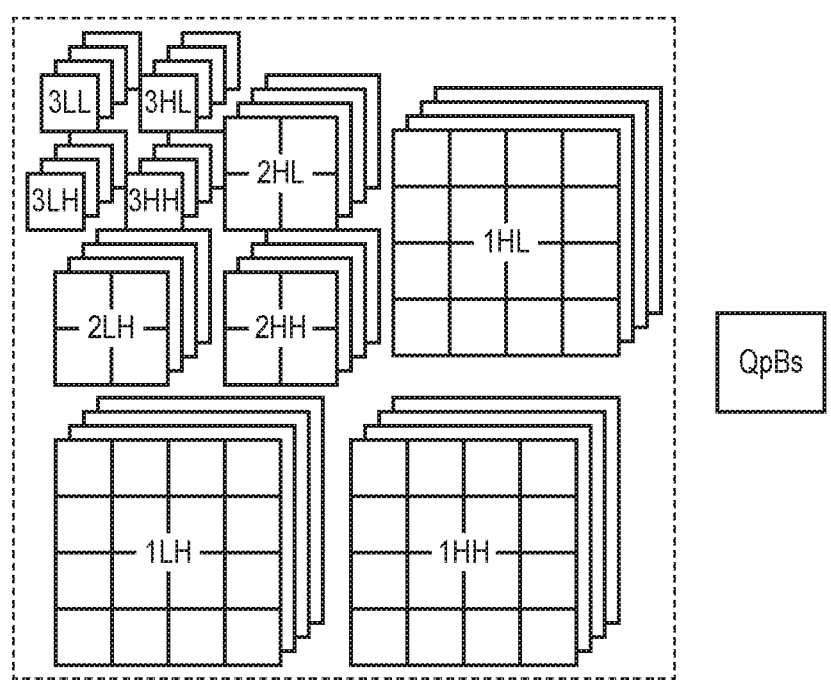
FIG. 6B is a diagram illustrating an example of the relationship between first quantization parameters (QpBs) and sub-band data according to an embodiment of the invention.

FIG. 6B illustrates the relationship between the first quantization parameters (QpBs) and the sub-band data when M=1 and N=1. As illustrated here, a single first quantization parameter (QpBs) is generated for a plurality of sub-band data of each of channels, included in a single segment.

With respect to evaluating the image quality for each segment, for example, of the sub-band data included in each segment, the 3LL sub-band data is evaluated as a low-frequency component, and a high-frequency component is evaluated by the 1HL, 1LH, and 1HH sub-band data. At this time, feed-forward control may be carried out to adjust the gain and offset for the third quantization parameters (QpBr) by carrying out code amount control such that the quantization is finer when the amplitude of the low-frequency component is lower and the quantization is rougher as the amplitude of the high-frequency component is higher.

Figure 7:
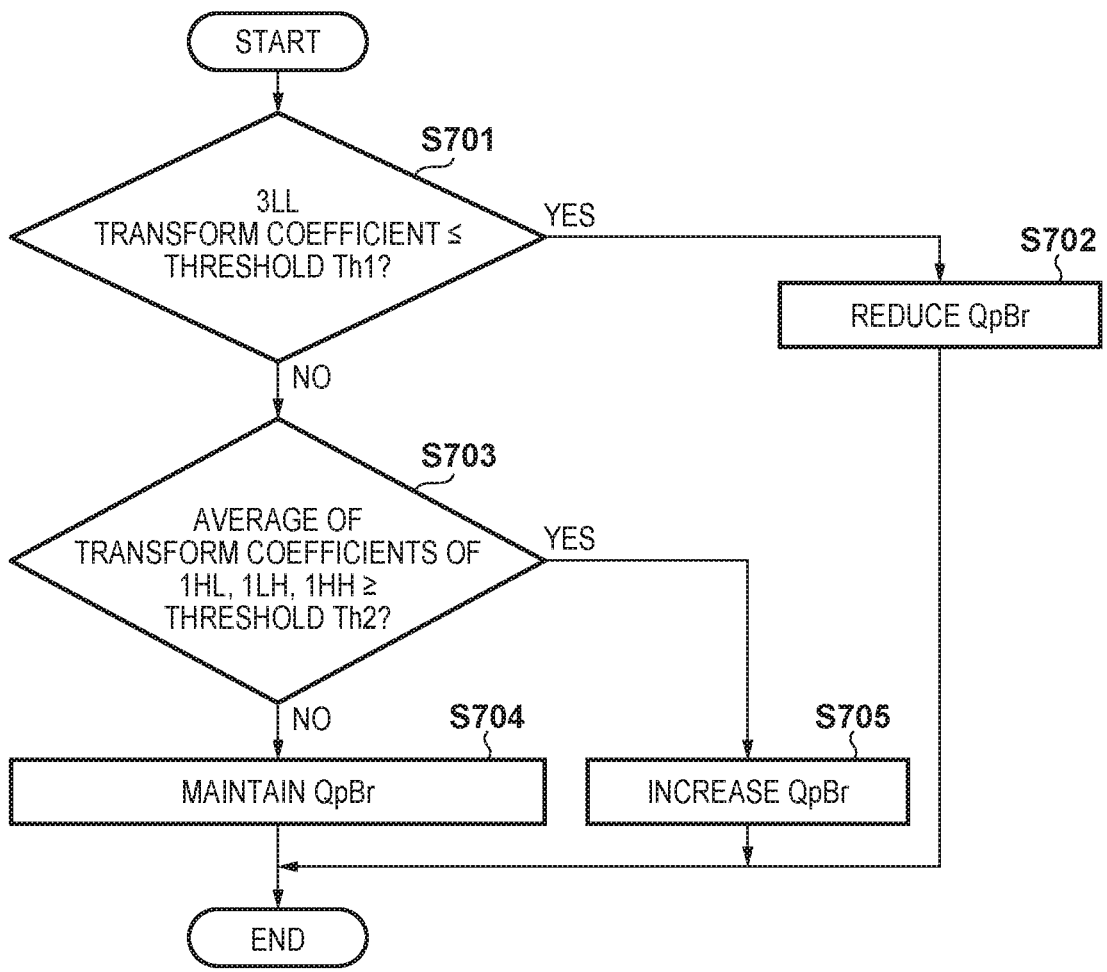
FIG. 7 is a flowchart illustrating an example of processing in quantization control based on image quality characteristics, according to an embodiment of the invention.

FIG. 7 is a flowchart illustrating an example of a process, executed by the quantization parameter generation unit 203, for adjusting the third quantization parameters (QpBr), based on image quality evaluation. The processing of this flowchart is realized by, for example, one or more processors functioning as the quantization parameter generation unit 203 executing a corresponding program (stored in ROM or the like).

In S701, the quantization parameter generation unit 203 makes a determination with respect to the low-frequency component. The 3LL transformation coefficient is compared with a threshold Th1 set for the determination, and if the 3LL transformation coefficient is less than or equal to the threshold ("YES" in S701), the process moves to S702. In S702, the quantization parameter generation unit 203 reduces the values of the third quantization parameters QpBr set for the band to which the segments being processed belong. For example, QpBr is multiplied by a coefficient of 1 or less, or a predetermined value is subtracted from QpBr.

If the determination of S701 indicates that the 3LL transformation coefficient is greater than the threshold Th1 ("NO" in S701), the process moves to S703. In S703, the quantization parameter generation unit 203 makes a determination with respect to the high-frequency component. An average value of the 1HL, 1LH, and 1HH transformation coefficients is compared with a threshold Th2 set for the determination, and if the average value is less than the threshold Th2 ("NO" in S703), the process moves to S704. If the average value is greater than or equal to the threshold Th2 ("YES" in S703), the process moves to S705. The values of QpBr are maintained in S704. The values of QpBr are increased in S705. For example, QpBr is multiplied by a coefficient of 1 or more, or a predetermined value is added to QpBr.

As described above, the result of adjusting the third quantization parameters QpBr on a segment-by-segment basis is taken as the first quantization parameters QpBs of those segments. If quantization control pertaining to image quality control is not carried out, QpBr may be used as QpBs as-is.

If, for example, M=1 and N=1 as described above, the first quantization parameters QpBs common for all channels and all sub-bands, generated as described above, correspond to 8×8 pixels in each channel, as illustrated in FIG. 8. Thus quantization control can be carried out in units of blocks of RAW data corresponding to 16×16 pixels of the original RAW data.

Next, a process of generating the individual second quantization parameters QpSb for each channel and each sub-band using the first quantization parameters QpBs will be described. As described above, in this embodiment, a single first quantization parameter QpBs is generated for each segment. However, the quantization of each segment in each channel does not use QpBs as-is; rather, the quantization process is carried out having generated the second quantization parameters QpSb, which correspond to individual channels and segments, from QpBs. The process of generating QpSb will be described next.

Equation 5 is a formula for generating QpSb.

$$QpSb[i][j]=QpBs\times\alpha[i][j]+\beta[i][j] \qquad \text{Equation 5}$$

QpSb: individual second quantization parameters for each channel and each sub-band QpBs: first quantization parameters common for all channels and all sub-bands α: slope β: intercept i: channel index (0 to 3)

j: sub-band index (0 to 9)

In equation 5, the slope α and intercept β are coefficients (variables) given individually for each channel and each sub-band, and can be set in advance. With respect to the channels C0 to C3, the value of α increases according to a relationship C0>C1=C2>C3, and the value of QpSb is greater the greater α is. For each of the sub-bands, the values of α and β are reduced to reduce the values of the quantization parameters in sub-bands of lower-frequency components, and the values of α and β are increased to increase the values of the quantization parameters in sub-bands of higher-frequency components.

The values of α[i][j] and β[i][j] are set in advance, but a plurality of combination may be prepared in accordance with the compression rate that is set. For example, if the compression rate is high, information will be lost if the value of QpSb is too high, and thus the values of α and β can be adjusted to be on the lower side so that QpSb does not become too high.

Thus the second quantization parameters QpSb are generated by correcting the first quantization parameters QpBs using individual weighting coefficients α and β for each channel and each sub-band, which makes it possible to carry out quantization control flexibly for each channel and each sub-band. Using the second quantization parameters QpSb for each channel and each sub-band generated on the basis of equation 5, the quantization units 204 quantize the transformation coefficients obtained from the frequency transform units 202.

The method by which the RAW data decoding unit 103D generates the second quantization parameters QpSb can be carried out according to the above-described equation 5. At that time, the values of the first quantization parameters QpSr, α, and β are provided from the quantization parameter decoding unit 212.

Figures 9A, 9B:
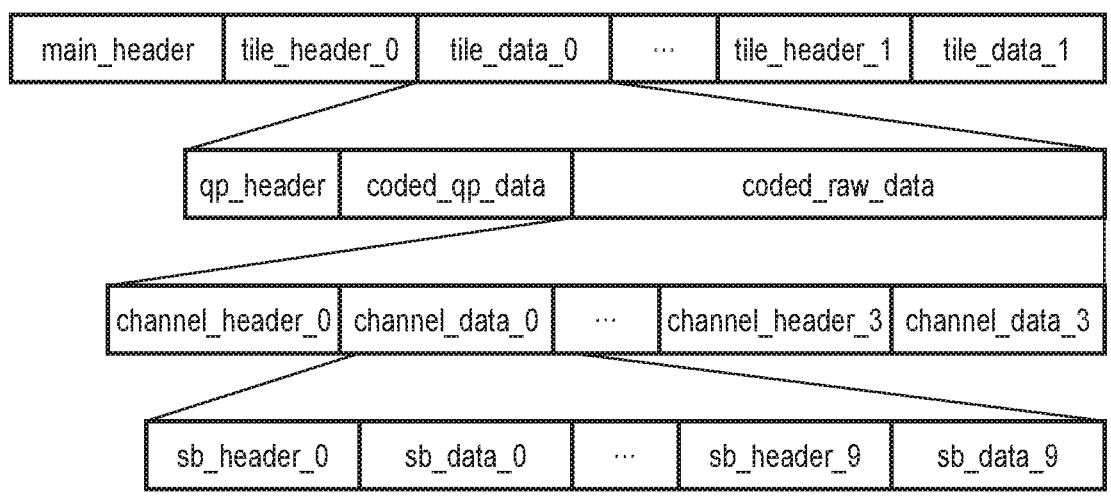
FIG. 9A is a diagram illustrating an example of the data structure of coded data according to an embodiment of the invention.
FIG. 9B is a diagram illustrating an example of a sub-band index according to an embodiment of the invention.

The sub-band data of each channel, coded by the RAW data coding/decoding unit 103 as described above, and the first quantization parameters QpBs, are multiplexed by the recording processing unit 106 on the basis of a predetermined data format and recorded as coded data. FIG. 9A illustrates an example of a data stricture when recording the coded data. As illustrated in FIG. 9A, the coded data has a hierarchical structure, starting with "main_header", which expresses information pertaining to the coded data as a whole. Data can be stored in units of tiles, using a "tile_header" and "tile_data", under the assumption that the RAW data is divided into tiles in units of a plurality of pixel blocks and coded in such a state. Although the foregoing describes the RAW data as being directly coded in units of channels and sub-band data, the coding is not limited to tiles, and a case where a predetermined grouping in the RAW data is used as a unit can be applied in the invention. In other words, even if the RAW data is divided into tiles and each tile is coded in units of channels and sub-band data, the same processing may be executed in units of tiles obtained by dividing the RAW data into a plurality of pieces. In this case, the sub-band data of each channel and the first quantization parameters QpBs are coded in units of tiles, and are included in the coded data. There is only one "tile_header" and "tile_data" if tile division is not carried out.

The "tile_data" includes the following elements. First, "qp_header", which expresses information pertaining to the coded first quantization parameters QpBs, and "coded_qp_data", which is the coded first quantization parameters themselves, are provided. "coded_raw_data" is arranged next in units of channels, and holds the number of channels' worth of coded data, in the order of "channel_header", which expresses information pertaining to that channel, and "channel_data", which is the actual data of that channel. "channel_data" is configured as a collection of coded data for each sub-band, with "sb_header" which expresses information pertaining to each sub-band, and "sb_data", which is the coded data for each sub-band, being arranged in sub-band index order. The sub-band index is as illustrated in FIG. 9B.

The syntax elements in each piece of header information will be described next with reference to FIGS. 10A to 10E. As illustrated in FIG. 10A, "main_header" is constituted of the following elements. "coded_data_size" expresses the overall data amount of the coded data. "width" expresses a width of the RAW data. "height" expresses a height of the RAW data. "depth" expresses a bit depth of the RAW data. "channel" expresses the number of channels when coding the RAW data. "type" expresses the type of channel transform. "lev" expresses the sub-band level of each channel.

As illustrated in FIG. 10B, "tile_header" is constituted of the following elements. "tile_index" expresses an index of the tiles for identifying tile division positions. "tile_data_size" expresses the amount of data included in the tile. "tile_width" expresses the width of the tile, "tile_height" expresses the height of the tile.

As illustrated in FIG. 10C, "qp_header" is constituted of the following elements. "qp_data_size" expresses the data amount of the coded first quantization parameters. "qp_width" expresses the width of the first quantization parameters, i.e., the number of first quantization parameters in the horizontal direction corresponding to the RAW data. "qp_height" expresses the height of the first quantization parameters, i.e., the number of first quantization parameters in the vertical direction corresponding to the RAW data.

As illustrated in FIG. 10D, "channel_header" is constituted of the following elements. "channel_index" expresses an index of the channels for identifying the channels. "channel_data_size" expresses the amount of data in the channel. As illustrated in FIG. 10E, "sb_header" is constituted of the following elements. "sb_index" expresses a sub-band index for identifying the sub-bands. "sb_data_size" expresses an amount of coded data in the sub-band. "sb_qp_a" expresses the value of α, indicated in equation 5, for generating the quantization parameters for each sub-band. "sb_qp_b" expresses the value of β, indicated in equation 5, for generating the quantization parameters for each sub-band.

According to the invention embodied as described thus far, rather than recording quantization parameters for all channels and all sub-bands, quantization parameter common for all channels and all sub-bands are recorded, and the quantization parameters for each of the channels and sub-bands can then be generated from the common quantization parameters. An effect of reducing the amount of data of the quantization parameters, which will be described below, can thus be achieved.

Consider a comparison between the data amount when recording all of the individual quantization parameters for each channel and each sub-band (a conventional example) and the data amount when recording quantization parameters common for all the channels and sub-bands (this embodiment). Here, a single quantization parameter is recorded for each sub-band from level 1 to level 3. As such, the data size of the quantization parameters recorded for a single segment will be (1×4 sub-bands+1×3 sub-bands+1×3 sub-bands)×4 channels, for a total of 40. On the other hand, only one common quantization parameter is required, and thus using the common quantization parameter as the quantization parameter to be recorded makes it possible to reduce the quantization parameter size to $\frac{1}{40}$.

Furthermore, the common quantization parameters to be recorded can, as illustrated in FIG. 11, be handled as screen data mapped to a two-dimensional coordinate system, and thus the data amount of the quantization parameters can be reduced further by applying the same predictive differential coding method (MED prediction) used when coding the quantization parameters. In FIG. 11, QpBs[p, q] represents the common quantization parameters assigned to each segment. p can take on a value from 1 to a segment division number P in the vertical direction, and q can take on a value from 1 to a segment division number Q in the horizontal direction. Each value of [p,q] corresponds to the position of that segment in the sub-band.

As described thus far, when RAW data is transformed into a plurality of channels and sub-band division is carried out in units of channels, individual quantization parameters for each channel and each sub-band can be generated in units of segments by using quantization parameters common for all channels and all sub-bands and a weighting function. This makes it possible use predictive coding to code the common quantization parameters as two-dimensional data, which greatly reduces the data amount of the quantization parameters while realizing flexible quantization control. This in turn makes it possible to record RAW data at high quality and at a compact size.

Second Embodiment

A second embodiment of the invention will be described next. The image capturing apparatus according to this embodiment can have the same configuration as the image capturing apparatus according to the first embodiment. However, the units for which the first quantization parameters are generated by the quantization parameter generation unit 203 of the RAW data coding/decoding unit 103, and the process for generating the individual second quantization parameters for each channel and each sub-band, are different. Configurations that are the same as in the first embodiment will not be described in this embodiment, with focus being given primarily to configurations pertaining to the different method of generating the quantization parameters.

Figure 12A:
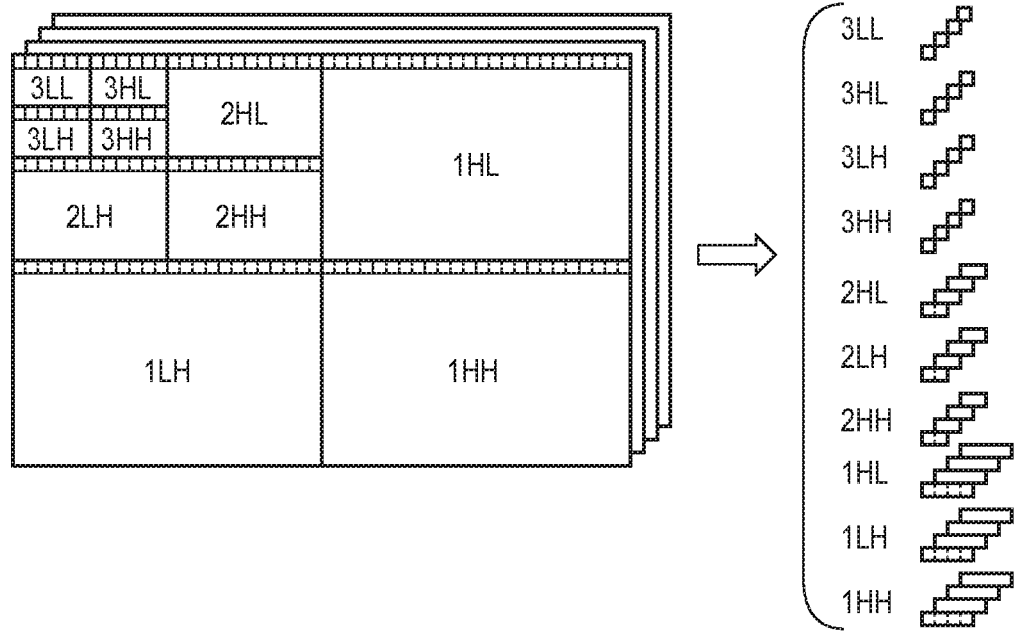
FIG. 12A is a diagram illustrating an example of units for evaluating sub-band data pertaining to image quality control and updating quantization parameters, according to a second embodiment of the invention.

FIG. 12A illustrates units for evaluating sub-band data pertaining to image quality control and updating quantization parameters in a case where each channel is divided into sub-bands at lev=3. The common first quantization parameters (QpBs) are generated for the sub-band data corresponding to (1×M)×1 (where M is an integer) lines in both the horizontal and vertical directions for the level 3 sub-bands (3LL, 3HL, 3LH, and 3HH), (2×M)×1 lines in both the horizontal and vertical directions for the level 2 sub-bands (2HL, 2LH, and 2HH), and (4×M)×1 lines in both the horizontal and vertical directions for the level 1 sub-bands (1HL, 1LH, and 1HH), for all channels.

Figure 12B:
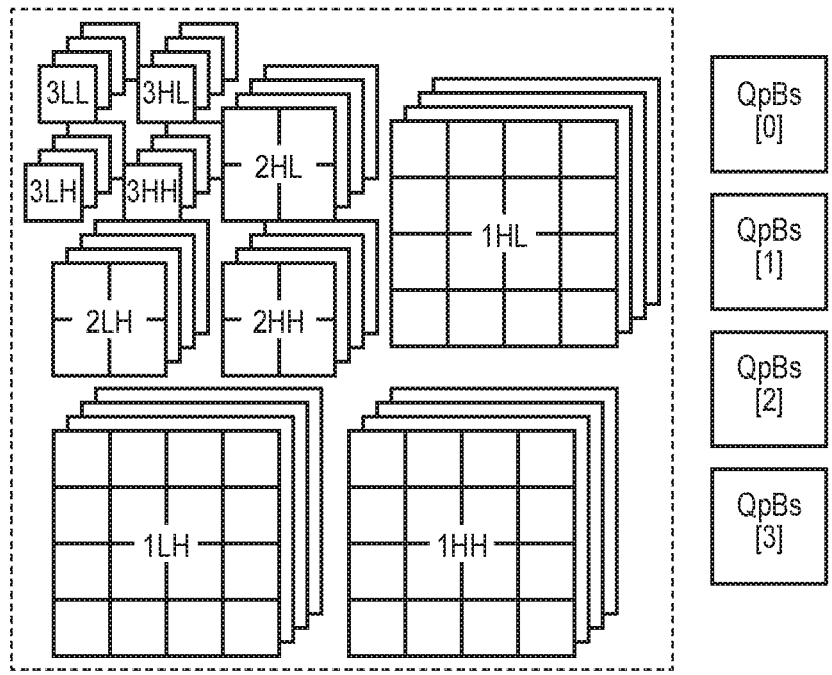
FIG. 12B is a diagram illustrating an example of the relationship between first quantization parameters (QpBs) and sub-band data according to the second embodiment of the invention.

Compared to the segments pertaining to image quality control illustrated in FIG. 6A, in FIG. 12A, the segment size in level 1 is ¼ in the vertical direction. Accordingly, the relationship between the first quantization parameters (QpBs) and the sub-band data when, for example, M=1 is as illustrated in FIG. 12B. Here, the segment size in level 1 is 4×1, and thus four first quantization parameters (QpBs) are present upon transformation into 4×4 segments. This makes it possible to carry out finer quantization control in the vertical direction than in the first embodiment. Note that the control can likewise be made finer in the horizontal direction as well.

Although the method of evaluating the sub-band data with respect to image quality control is substantially the same as in the first embodiment, the target of evaluation for the low-frequency component is not 3LL in this embodiment, but is rather the sub-band data corresponding to 1LL, which is generated intermediately in the process of sub-band division. The flow of processing is also similar to that of the flowchart illustrated in FIG. 7, but the subject of determination in S701 is the transformation coefficient of 1LL rather than 3LL.

In this embodiment, if the transform has resulted in, for example, 4×4 segments for M=1, the number of quantization parameters in units of lines, which are the subject of image quality control, will differ between level 1 and level 3. As such, the first quantization parameters QpBs cannot be used in common from level 1 to level 3 as in the first embodiment. Accordingly, in this embodiment, QpLv1 to QpLv3 are generated for corresponding levels from the four QpBs in level 1, on the basis of the following equation 6, and the individual second quantization parameters QpSb corresponding to each channel and each sub-band are generated using QpLv1 to QpLv3.

Figure 12C:
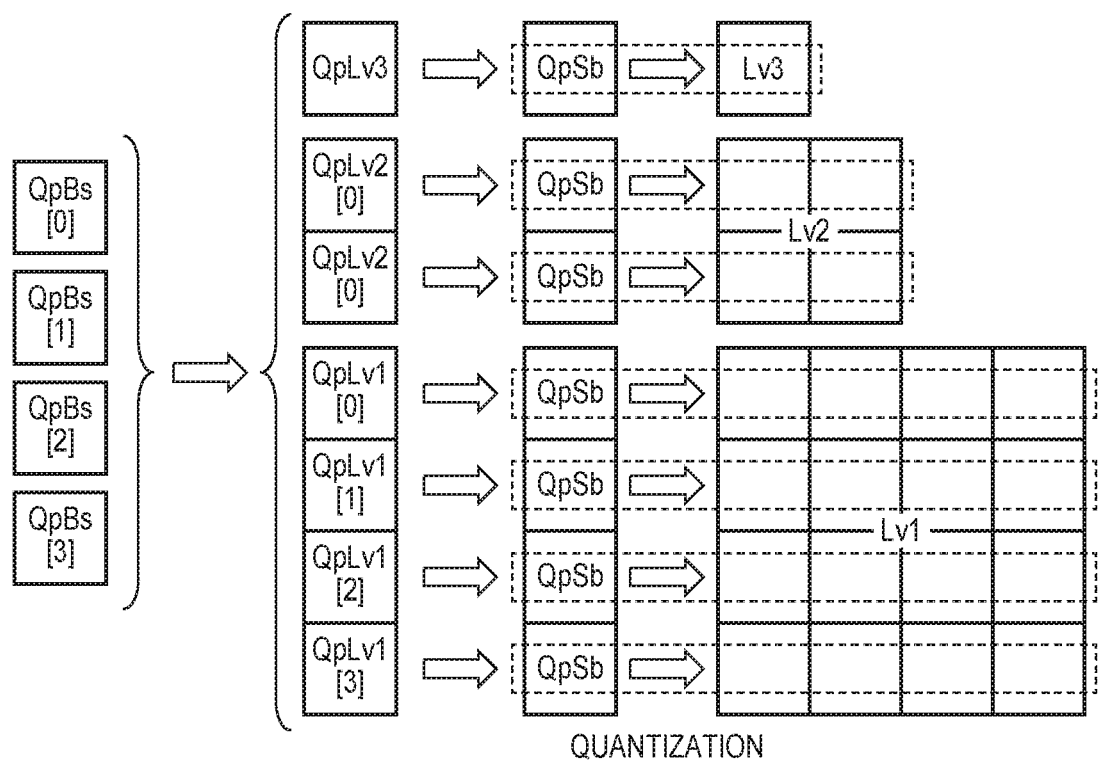
FIG. 12C is a diagram illustrating an example of the relationship between each of quantization parameters and a sub-band to be quantized, according to the second embodiment of the invention.

$QpLv1[m]=QpBs[m]$ $QpLv2[n]=(QpBs[n\times2]+QpBs[n\times2+1])>>1$ $QpLv3[n]=(QpBs[0]+QpBs[1]+QpBs[2]+QpBs[3])>>2$      Equation 6 m: line number (0 to 3) for level 1 sub-band in units of segments n: line number (0 to 1) for level 2 sub-band in units of segments >>: rightward bit shift Although the level 2 and level 3 quantization parameters are calculated from the average value of the corresponding QpBs as indicated in equation 6, the maximum-value or minimum-value QpBs may be selected. Alternatively, QpLv3 may be calculated as the average value, the maximum value, or the minimum value of QpLv2. Ultimately, the second quantization parameter (QpSb) of each channel and sub-band ultimately used in the quantization may be calculated by replacing QpBs in the above-described equation 5 with QpLv1 to QpLv3, and the relationship between the quantization parameters and the sub-bands being quantized becomes as illustrated in FIG. 12C.

The degree to which the data amount of the recorded quantization parameters is reduced according to this embodiment will be described next with reference to FIG. 13. Assuming, in the conventional example serving as a comparison, that the quantization parameters are recorded in units of single lines in each level, if the quantization parameters for the level 3 sub-bands are taken as 1, twice the quantization parameters will be recorded in level 2 as in level 3, and four times the quantization parameter will be recorded in level 1 as in level 3. As such, the data size of the quantization parameters recorded for a single segment will be (1×4 sub-bands+2×3 sub-bands+4×3 sub-bands)×4 channels, for a total of 88. On the other hand, the common quantization parameters correspond to the level 1 sub-band, for a number of 4, and thus using the common quantization parameters as the quantization parameters to be recorded makes it possible to reduce the quantization parameter size to 1/22.

Thus even when carrying out finer quantization control in the vertical direction as in this embodiment, a sufficient data reduction effect can be achieved as compared to the conventional example. As in the first embodiment, it is possible, in this embodiment, to use predictive coding to code the common quantization parameters as two-dimensional data, which greatly reduces the data amount of the quantization parameters while realizing flexible quantization control. This in turn makes it possible to record RAW data at high quality and at a compact size.

Other Embodiments

Embodiments of the invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-119887, filed on Jun. 19, 2017, which is hereby incorporated by reference herein in its entirety.

What is claimed is:

1. An image coding apparatus comprising at least one processor which functions as:
   a generating unit configured to generate transformation coefficients of a plurality of sub-band from RAW data;
   a quantization parameter generating unit configured
   (i) to divide the transformation coefficients of each sub-band into an equal number of segments, and
   (ii) for each respective segment, (a) to generate a first quantization parameter common for the plurality of sub-band, and (b) to generate second quantization parameters corresponding to each of the plurality of sub-band on the basis of the first quantization parameter and weighting coefficients set individually for each of the plurality of sub-band;
   a quantizing unit configured to quantize the transformation coefficients of the plurality of sub-band on the basis of the second quantization parameters generated by the quantization parameter generating unit; and
   a coding unit configured to code a quantization result, obtained from the quantizing, for each sub-band.

2. The image coding apparatus according to claim 1, wherein the weighting coefficients are pre-set individually for each of the plurality of sub-band.

3. The image coding apparatus according to claim 2, wherein the weighting coefficients are set in accordance with a compression rate set for coded data generated by the coding unit.

4. The image coding apparatus according to claim 3, wherein the weighting coefficients are assigned in common for at least a plurality of the first quantization parameters.

5. The image coding apparatus according to claim 4, wherein the weighting coefficients are assigned in common for each of groups of a plurality of the segments.

6. The image coding apparatus according to claim 1, wherein the coding unit includes the first parameters corresponding to the segments and the weighting coefficients in the coded data for each of the groups.

7. The image coding apparatus according to claim 1, wherein the quantization parameter generating unit quantizes transformation coefficients of the plurality of sub-band in a predetermined unit of lines, and determines the first quantization parameter from a third quantization parameter determined on the basis of a difference between a target code amount in the case where coding is carried out and a generated code amount resulting from the coding.

8. The image coding apparatus according to claim 7, wherein the quantization parameter generating unit determines the first quantization parameter for each segment by correcting the third quantization parameter set for each segment of the plurality of sub-band, in accordance with image quality characteristics of each segment.

9. The image coding apparatus according to claim 7, wherein the generating unit generates the sub-band constituted of a plurality of levels through a discrete wavelet transform; and the quantization parameter generating unit determines the first quantization parameter by correcting the third quantization parameter in accordance with image quality characteristics in a unit of one line of the segments in the sub-band data belonging to the level generated first among the plurality of levels.

10. The image coding apparatus according to claim 8, wherein the quantization parameter generating unit: corrects the first quantization parameter by reducing the first quantization parameter in the case where the image quality characteristics indicate that a low-frequency component amplitude is low; and corrects the first quantization parameter by increasing the first quantization parameter in the case where the image quality characteristics indicate that a high-frequency component amplitude is high.

11. The image coding apparatus according to claim 1, wherein the segments are generated by dividing transformation coefficients of each of the plurality of sub-band so that each sub-band has the same number of segments.

12. The image coding apparatus according to claim 2,
wherein the generating unit generates transformation coefficients of the plurality of sub-band for each of a plurality of channels obtained by transforming the RAW data;
the first quantization parameter is assigned in common on a segment-by-segment basis to the plurality of sub-band in each of the plurality of channels;
the second quantization parameters are quantization parameters for quantizing transformation coefficients of each of the plurality of sub-band of each channel on a segment-by-segment basis;
the quantizing unit quantizes transformation coefficients of each of the plurality of sub-band of each channel on a segment-by-segment basis using the second quantization parameters; and
the coding unit codes the quantization result on a channel-by-channel basis in units of the sub-band.

13. The image coding apparatus according to claim 1, wherein the coding unit codes the quantization result and codes the first quantization parameter through the same coding method.

14. The image coding apparatus according to claim 1, wherein the at least one processor further functions as: an obtainment unit configured to obtain the RAW data.

15. An image decoding apparatus that decodes coded data generated by the image coding apparatus according to claim 1, wherein the at least one processor further functions as
a decoding unit configured to decode the coded data and generate the quantization result and the first quantization parameter;
an inverse-quantizing unit configured to inverse-quantize the quantization result on the basis of the quantization parameter generated by the decoding unit and generate transformation coefficients of the plurality of sub-band; and
a generating unit configured to transform the generated transformation coefficients of the plurality of sub-band and generate the RAW data.

16. The image decoding apparatus according to claim 15, wherein the at least one processor further functions as
a second quantization parameter generating unit configured to generate the second quantization parameters on the basis of the first quantization parameter, wherein the second quantization parameter generating unit generates the second quantization parameters by correcting the first quantization parameter using coefficients preset for each of the plurality of sub-band; and
the inverse-quantizing unit generates transformation coefficients of the plurality of sub-band by inverse-quantizing the quantization result on the basis of the second quantization parameters.

17. An image coding method comprising:
generating transformation coefficients of a plurality of sub-band from RAW data;
dividing the transformation coefficients of each sub-band into an equal number of segments;
for each respective segment, (a) generating a first quantization parameter common for the plurality of sub-band, and (b) generating second quantization parameters corresponding to each of the plurality of sub-band on the basis of the first quantization parameter and weighting coefficients set individually for each of the plurality of sub-band;
quantizing the transformation coefficients of the plurality of sub-band on the basis of the second quantization parameters generated in the (b) generating; and
coding a quantization result, obtained from the quantizing, for each sub-band.

18. An image decoding method that decodes coded data generated by the image coding apparatus according to claim 1, the method comprising:
decoding the coded data and generating the quantization result and the first quantization parameter;
inverse-quantizing the quantization result on the basis of the quantization parameter generated by the generating and generating transformation coefficients of the plurality of sub-band; and
transforming the generated transformation coefficients of the plurality of sub-band and generating the RAW data.

19. A non-transitory computer-readable storage medium storing a program that, when executed by a processor of an image coding apparatus, causes the processor to perform:
generating transformation coefficients of a plurality of sub-band from RAW data;
dividing transformation coefficients of each sub-band into an equal number of segments;
for each respective segment, (a) generating a first quantization parameter set common for the plurality of sub-band, and (b) generating second quantization parameters corresponding to each of the plurality of sub-band on the basis of the first quantization parameter and weighting coefficients set individually for each of the plurality of sub band;
quantizing the transformation coefficients of the plurality of sub-band on the basis of the second quantization parameters generated in the (b), generating; and
coding a quantization result, obtained from the quantizing, for each sub-band.

20. A non-transitory computer-readable storage medium storing a program that, when executed by a processor of an image decoding apparatus that decodes coded data generated by the image coding apparatus according to claim 1, causes the processor to perform:
decoding the coded data and generating the quantization result and the first quantization parameter;
inverse-quantizing the quantization result on the basis of the quantization parameter generated by the generating and generating transformation coefficients of the plurality of sub-band; and
transforming the generated transformation coefficients of the plurality of sub-band and generating the RAW data.

* * * * *